Sept. 24, 1935. H. A. ROSE 2,015,534
FILTER SYSTEM FOR MERCURY ARC RECTIFIERS
Filed May 27, 1933
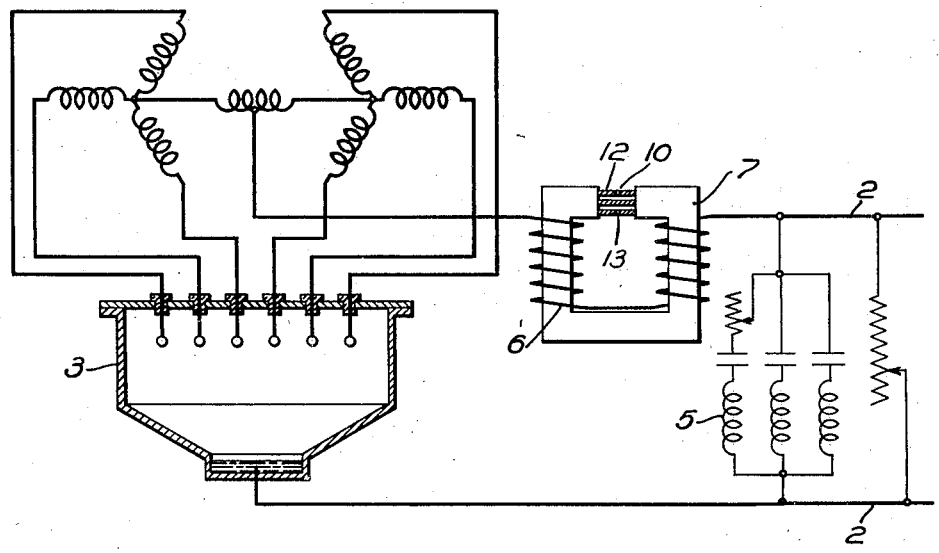
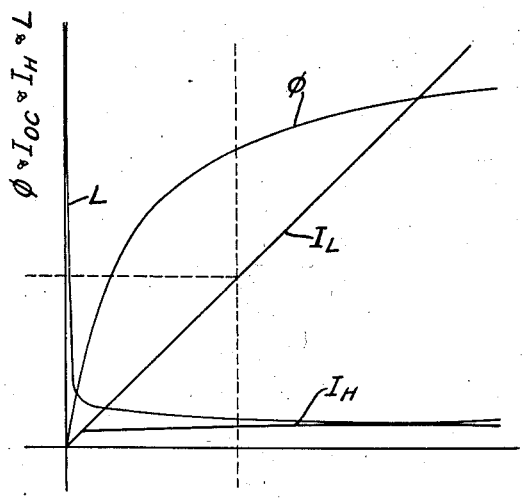
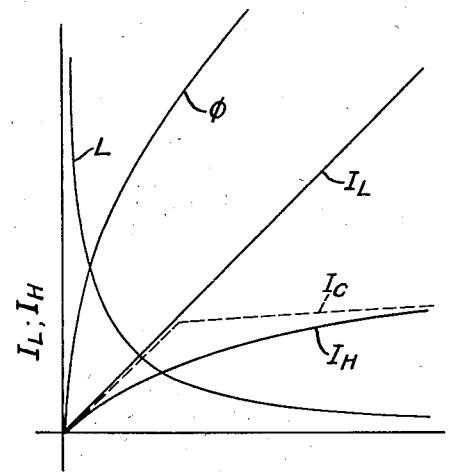
WITNESSES:
INVENTOR
Herbert A. Rose.
BY
ATTORNEY Patented Sept. 24, 1935

2,015,534

UNITED STATES PATENT OFFICE 2,015,534

FILTER SYSTEM FOR MERCURY-ARC RECTIFIERS

Herbert A. Rose, Pittsburgh, Pa., assignor to Westinghouse Electric & Manufacturing Company, East Pittsburgh, Pa., a corporation of Pennsylvania Application May 27, 1933, Serial No. 673,204

5 Claims. (Cl. 178—44)

My invention relates to a filter system for a mercury-arc rectifier, and particularly to a series reactor having variable reactance with change in load current.

In the operation of distribution systems utilizing mercury vapor devices, the vapor-electric devices in addition to converting alternating current to direct current or vice versa also act as harmonic generators and impress harmonic voltages on the systems. As these harmonic voltages may cause serious disturbances, it is customary to provide suitable filter equipment for minimizing the harmonic voltages which would otherwise be impressed on the system. These are usually connected to the direct circuit system and consist of a plurality of impedance devices tuned to certain definite frequencies. In the preferred form, the filter equipment consists of a reactor in series with the load bus and a set of tuned shunt elements connected across the circuit to be filtered. The tuned shunt elements, in the preferred form, each consist of a reactor connected in series with a suitable capacitor. The reactive and capacitive impedances of each element are so proportioned that the element as a whole is preferably tuned to the particular harmonic frequency involved. It is usual practice to provide a plurality of these tuned shunt elements because a number of harmonic voltages are usually troublesome and must be either reduced, or in certain cases practically eliminated. By making the reactive and capacitive impedances equal, the shunt filter element is tuned and acts as essentially a short circuit or a circuit of low impedance to the particular frequency involved. As connected, this arrangement minimizes the harmonic voltage applied to the system by causing the generated harmonic voltages to be absorbed in the series reactance or any impedances in the circuit.

The current taken by the shunt filter elements under normal operation is determined by the voltages of the harmonic generator circuits and the impedance of those circuits together with the impedance of the shunt filter itself. When the load on the rectifying system is approximately equal to or greater than this circuit, the operation of the filter system is normal. However, when the load is less than a certain critical amount, substantially equal to the normal current of the filter system, the operation of the filter and rectifying systems is completely changed and a condition of unstable operation ensues.

This condition of instability comes about through the fact that the load current is insufficient to maintain normal operation of the filter. When this condition obtains the rectifying apparatus supplies current tending to charge the capacitors of the shunt filters to a voltage substantially equal to the peak of the direct-current ripple voltage, in addition to supplying the load current. The ripple voltage of the rectifier rises and falls at harmonic voltage frequency. It follows that with the capacitors charged to the peak ripple voltage any lowering of the rectifier voltage will result in the capacitors tending to supply the direct-current load and the current from the rectifier to fall to zero. This results in extinguishment of the cathode spot or rectifying arc in the rectifier. When this condition obtains it is necessary that the load voltage fall below the rectifier voltage by a certain amount which I prefer to call the re-ignition characteristic of the particular rectifier. In certain cases and conditions the load voltage as determined by the discharging condensers must fall to as much as 20% to 50% or more before re-ignition takes place. In actual operation it has been found that this condition of instability of extinction and re-ignition occurs with varying frequency and amounts of voltage fluctuation.

It has heretofore been the practice to connect certain voltage sensitive electrical control devices such as the holding coils of the circuit breaker to the load bus. These devices upon being subject to this condition function to cause faulty or false operation resulting in shut down of the station and interruption of service.

This is particularly objectionable in such systems as railway networks where power may be fed into non-regenerative sections of load and where every precaution must be taken to prevent a service interruption.

In order to prevent extinguishing the rectifying arc, it is an object of my invention to provide a series reactor having increasing reactance with decrease of the direct current load.

The reactor, according to my invention, is provided with a core having an air gap or a substantially non-magnetic section of such dimension that the reactance at normal load currents will reduce the harmonic voltages the amount necessary for interference mitigation.

In order to secure increasing reactance for decreasing load current, I provide the air gap with one or more magnetic shunts of a capacity such that they will be saturated by the heavier direct current loads but will not be saturated greater than the value for direct current loads in the order of those taken by the shunt filters during normal operation. As the direct current decreases the magnetic bridges will no longer be saturated and the reactance will be increased.

It is a further object of my invention to provide a series reactor having a reactance variable with variation of the load current.

It is a further object of my invention to provide a high reactance filter system during light load operation.

It is a further object of my invention to increase the stability range of a vapor-electric rectifier.

Other objects and advantages of my invention will be apparent from the following detailed description taken in conjunction with the accompanying drawing, in which:

Figure 1 is a schematic illustration of a rectifier system embodying my invention;

Fig. 2 is a graphical illustration showing the electrical characteristics of the series reactor according to my invention; and, Fig. 3 is an enlarged illustration of that portion of the graphs in the critical load range of the rectifier.

The system, according to my invention, comprises a source 1 of alternating current connected to a direct-current system 2 by means of a suitable rectifying device, such as a mercury-arc rectifier 3.

The filter comprises suitable tuned shunts 5 across the direct-current line 2 and a winding 6 having a suitable magnetic core 7, such as laminated iron. In order to prevent saturation of the core 7 by the direct current a suitable gap 10 is provided in the core.

According to my invention, I provide a suitable magnetic bridge 12 across the high reluctance portion 10 of the core 7. The bridge 12 is of such proportions that when a direct current $I_L$ is flowing, greater than that necessary to maintain normal operation of the filter, the magnetic bridge 12 will be substantially saturated, and the reactance will be established at a range of values suitable to secure interference mitigation. However, if the direct current $I_L$ should decrease the magnetic bridge 12 will be unsaturated and the reactance of the winding 6, accordingly increased. Further reduction of the direct current $I_L$ still further decreases the reluctance of the magnetic bridges 12 which still further decreases the harmonic current $I_H$ that can flow through the series reactor 7 so that the value of $I_H$ is constantly less than the critical value $I_c$.

The bridge 12 provides in effect a secondary flux path of a lesser flux carrying capacity than that of the main core. This in effect acts as two separate cores, one of large cross section having a large gap and another or secondary path of small section. For control purposes the bridge 12 may be provided with one or more gaps 13 of small size in order to prevent saturation at low values of direct current.

By properly proportioning the magnetic bridge 12, it is possible to maintain the harmonic currents $I_H$ constantly below the value of the direct current $I_L$ so that the cathode spot is not extinguished. In this manner unstable operation of the rectifier is prevented.

Although I have shown and described a specific embodiment of my invention, it is apparent that changes and modifications may be made therein without departing from the spirit and scope of my invention. I desire, therefore, that only such limitations shall be imposed as are embodied in the accompanying claims or as may be necessitated by the prior art.

I claim as my invention:

1. A filter system for a variable load direct current circuit supplied by a vapor electric device, comprising a harmonic shunt across said circuit, a winding in series with said circuit, a core in said winding and means in said core for varying the inductance of said winding with variation of load current.

2. A filter system for maintaining arc stability in a mercury vapor device comprising a load circuit receiving the output of the device, a filter circuit across said circuit, a series reactor in said circuit and means for varying the effective value of said reactor comprising a magnetic core, said core having a gap therein and means for reducing the effect of the gap at low values of load current.

3. A filter system for the output circuit of a vapor-electric device comprising a tuned shunt across the output circuit, a reactor in series with said circuit, a magnetizable core in said reactor, a gap in said core and a bridge of magnetizable material in said gap.

4. A filtering system for a valve type current rectifying device comprising a conductor carrying the load current delivered by said device, a winding connected in series with said conductor, a core of magnetic material linked with said winding, said core having a gap therein, a bridge of magnetic material across said gap, said bridge having a flux capacity less than that of said core, a conductor forming a return circuit for the load current of said device, a plurality of tuned circuits connected between said conductors at a point outside of said winding.

5. A filtering system for a vapor electric converter supplying a variable load comprising a winding connected in series with the converter and traversed by the output current thereof, a plurality of tuned circuits connected across said converter and said winding and means for controlling the reactance of said winding in response to the value of the load current comprising a core of magnetic material linked with said core, said core having a gap therein, a bridge of magnetic material in said gap, said bridge having a flux capacity less than that of said core and said bridge having a portion of reduced flux capacity.

HERBERT A. ROSE.